(12) United States Patent
Perry et al.

(10) Patent No.: US 8,102,397 B2
(45) Date of Patent: Jan. 24, 2012

(54) METHOD FOR IMPROVING UNIFORM WIDTH CHARACTER STROKES USING MULTIPLE ALIGNMENT ZONES

(75) Inventors: Ronald N. Perry, Cambridge, MA (US); Eric Chan, Belmont, MA (US)

(73) Assignee: Mitsubishi Electric Research Laboratories Inc., Cambridge, MA (US)

( * ) Notice: Subject to any disclaimer, the term of this patent is extended or adjusted under 35 U.S.C. 154(b) by 534 days.

(21) Appl. No.: 12/359,882

(22) Filed: Jan. 26, 2009

(65) Prior Publication Data
US 2010/0188408 A1    Jul. 29, 2010

(51) Int. Cl.
G06T 11/00    (2006.01)
G09G 5/00    (2006.01)

(52) U.S. Cl. .......... 345/469; 345/467; 345/611

(58) Field of Classification Search .......... 345/467, 345/469, 611; 382/179
See application file for complete search history.

(56) References Cited

U.S. PATENT DOCUMENTS

| | | | |
|---|---|---|---|
| 5,526,476 A * | 6/1996 | Motokado et al. ......... | 345/471 |
| 5,734,388 A * | 3/1998 | Ristow et al. ......... | 345/472 |
| 5,754,187 A * | 5/1998 | Ristow et al. ......... | 345/469 |
| 5,982,387 A * | 11/1999 | Hellmann ......... | 345/469 |
| 7,801,932 B2 * | 9/2010 | Krishnaswamy ......... | 707/684 |
| 2005/0237342 A1 * | 10/2005 | Stamm et al. ......... | 345/613 |
| 2007/0188497 A1 * | 8/2007 | Dowling et al. ......... | 345/469 |

OTHER PUBLICATIONS

Elena J. Jakubiak et al."An Improved Representation for Stroke-based Fonts", Siggraph 2006 Conference Abstracts and Applications.

* cited by examiner

*Primary Examiner* — Chante Harrison
(74) *Attorney, Agent, or Firm* — Dirk Brinkman; Gene Vinokur (57) ABSTRACT

A method aligns a character to a sampling grid of an image. An original uniform width path that traces a skeleton of the character is specified by input pen commands having original coordinates. The width of the original path is rounded to a nearest integer to produce a hinted width. The original path is traversed using the input pen commands to identify segments of the path. The segments are stored in an array. Hinted coordinates are determined for each segment in the array. The array is sorted, and a directed acyclic graph (DAG) is constructed. Collisions between the segments are resolved using the sorted array, the DAG, and the width of the hinted path. The segments are fitted to the sampling grid, and the result is stored in output pen commands, thereby aligning the skeleton of the character to the sampling grid.

19 Claims, 8 Drawing Sheets

METHOD FOR IMPROVING UNIFORM WIDTH CHARACTER STROKES USING MULTIPLE ALIGNMENT ZONES

RELATED PATENT APPLICATIONS

The following Patent Applications are all related, co-filed, and incorporated into each other: U.S. Non-Provisional patent application Ser. No. 12/359,913, "Method for Improving Character Outlines Using Multiple Alignment Zones," filed by Perry et al. on Jan. 26, 2009; and MERL-2083 U.S. Non-Provisional patent application Ser. No. 12/359,819, "Method for Converting Outline Characters to Stylized Stroke Characters," filed by Jakubiak et al. on Jan. 26, 2009.

FIELD OF THE INVENTION

The invention relates generally to rendering characters, and more particularly to grid aligning characters with uniform width strokes.

BACKGROUND OF THE INVENTION

Grid Fitting

Figure 1A:
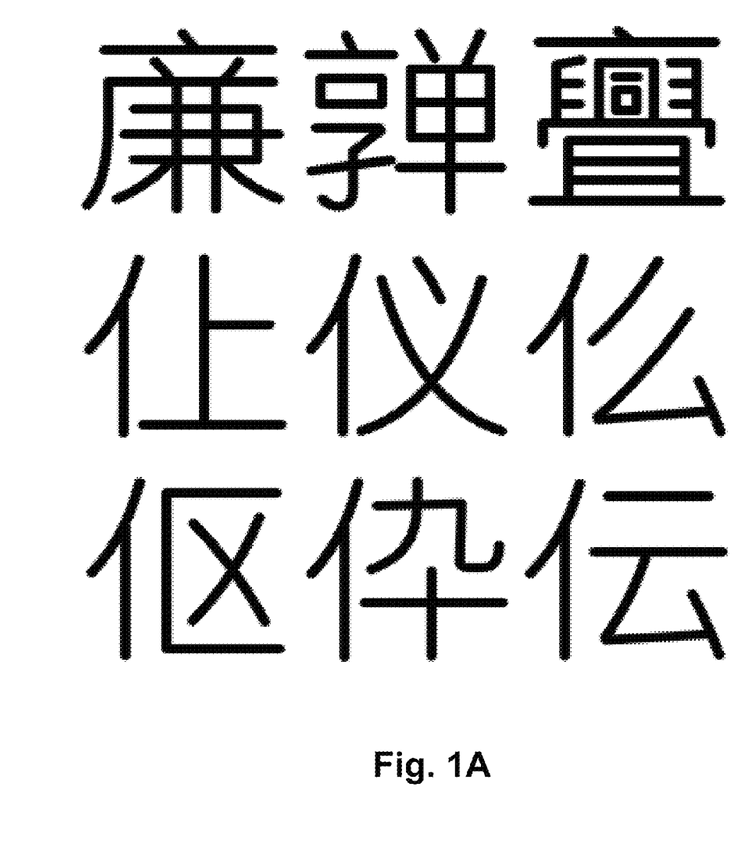
FIG. 1A is a diagram of characters with uniform width strokes to be aligned according to embodiments of the invention.

Rendering characters or glyphs for display and printing is problematic, particularly if the characters are complex. This is particularly true for Chinese, Japanese, and Korean (CJK) character sets, see FIG. 1A. The characters shown have uniform width strokes. It is an object of the invention to automatically align the strokes to a sampling grid (e.g., a pixel or sub-pixel grid) for the purpose of rendering, see the related Applications.

Hints

Hints are a set of rules or procedures stored with each glyph to specify how the glyph should be modified during rendering to preserve features such as symmetry, stroke weight, and a uniform appearance across all the glyphs in a typeface. Hinting requires aligning edges of characters to the sampling grid. At small screen sizes, with or without antialiasing, hinting is critical for producing clear and legible text for human readers. Hinting can be manual, automatic, or combinations thereof.

Manual hinting is labor intensive and expensive. For example, developing a well-hinted typeface for a Japanese or Chinese font, which can have more than ten thousand glyphs, can take years. Because the focus of hinting is on improving the rendering quality of body type, the hints tend to be ineffective for type placed along arbitrary paths and for animated type.

Current methods for automatic hinting produce reasonable results for simple scripts such as Latin, but are inadequate for complex scripts such as Chinese and Japanese. Consequently, there is a need for an automatic hinting method that can effectively handle complex glyphs. With automatic hinting, labor cost is eliminated and font size is significantly reduced because manual hints, which are stored in a font file, are no longer needed.

SUMMARY OF THE INVENTION

A method aligns a character to a sampling grid of an image. An original uniform width path that traces a skeleton of the character is specified by input pen commands having original coordinates.

The width of the original path is rounded to a nearest integer to produce a hinted width. The original path is traversed using the input pen commands to identify segments of the path. The segments are stored in an array.

Hinted coordinates are determined for each segment in the array. The array is sorted, and a directed acyclic graph (DAG) is constructed. Collisions between the segments are resolved using the sorted array, the DAG, and the width of the hinted path. The segments are fitted to the sampling grid, and the result is stored in output pen commands having the hinted coordinates to align the skeleton of the character to an integer sampling grid. If the width of the hinted path is an even integer, 0.5 is added to each hinted coordinate of each output pen command to align the skeleton of the character to a half-integer sampling grid.

DETAILED DESCRIPTION OF THE PREFERRED EMBODIMENT

Alignment and Grid Fitting

Figure 1B:
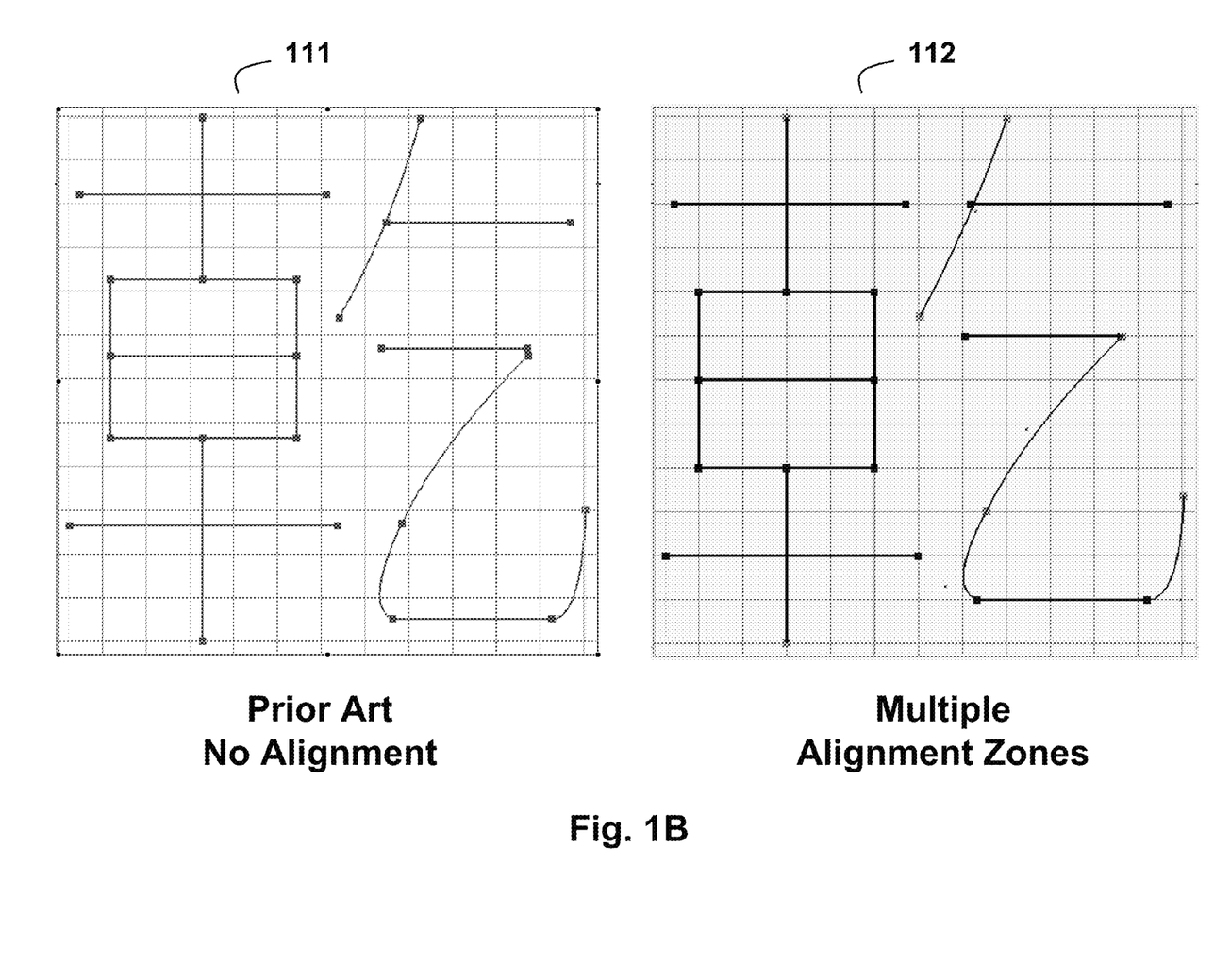
FIG. 1B is a schematic of sampling grids with comparative alignment of a character.

FIG. 1B shows a Chinese character on a sampling grid with no alignment 111 and alignment 112 according to embodiments of the invention. Because the invention detects and aligns multiple zones in a character, the method is called multiple alignment zones (MAZ).

Figure 1C:
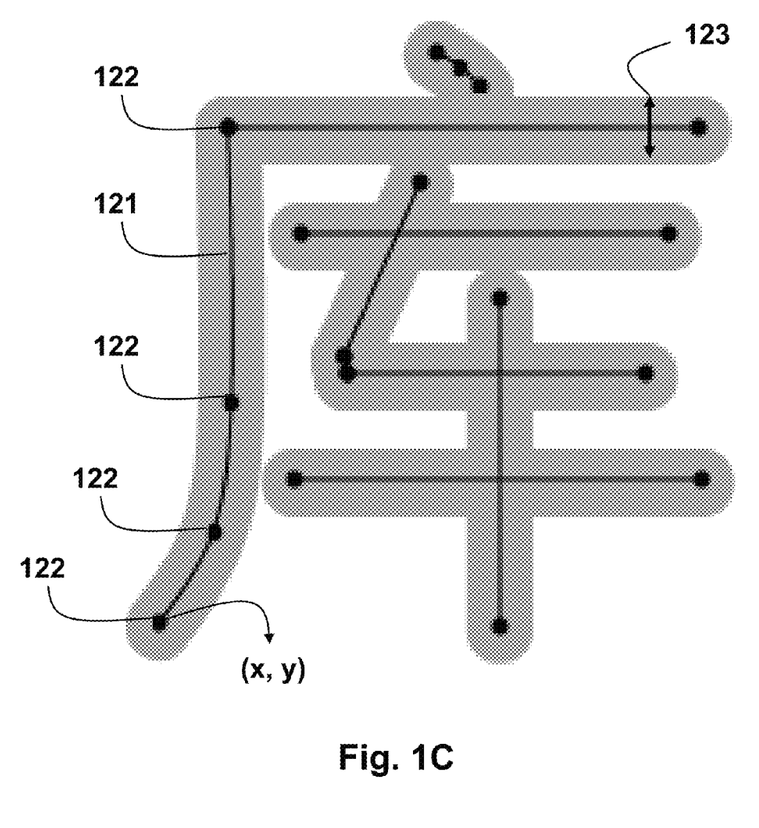
FIG. 1C is a diagram of character with uniform width strokes to be aligned according to embodiments of the invention.

FIG. 1C shows a character to be aligned according to embodiments of the invention. The character is represented by a path or skeleton 121. The path comprises pen commands, as described below. The pen commands specify (x, y) coordinates 122 of the path. A width 123 of the strokes is uniform.

Figure 2A:
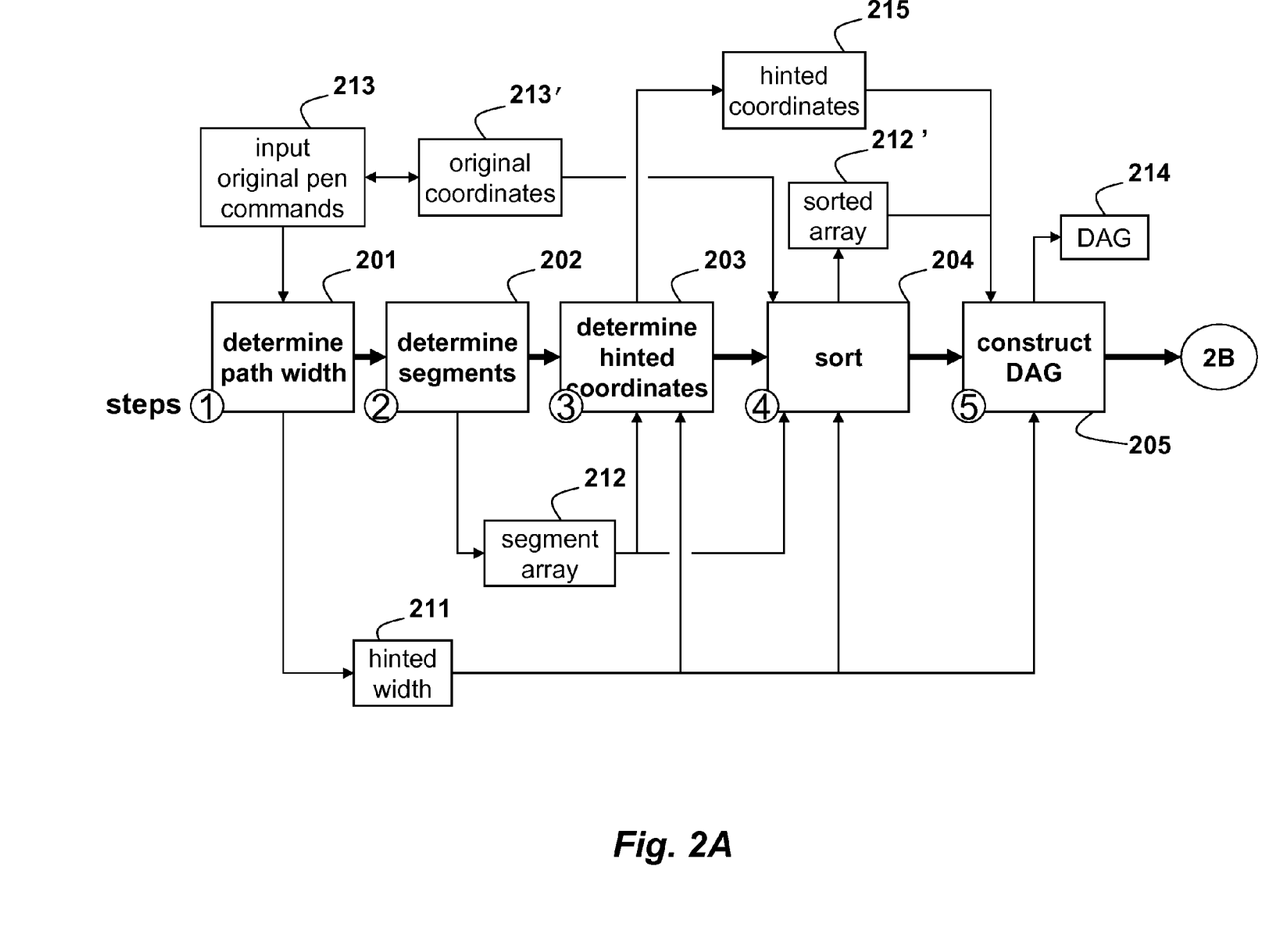
FIGS. 2A-2B is a flow diagram of a method for aligning uniform width stroke-based characters according to embodiments of the invention.
Figure 2B:
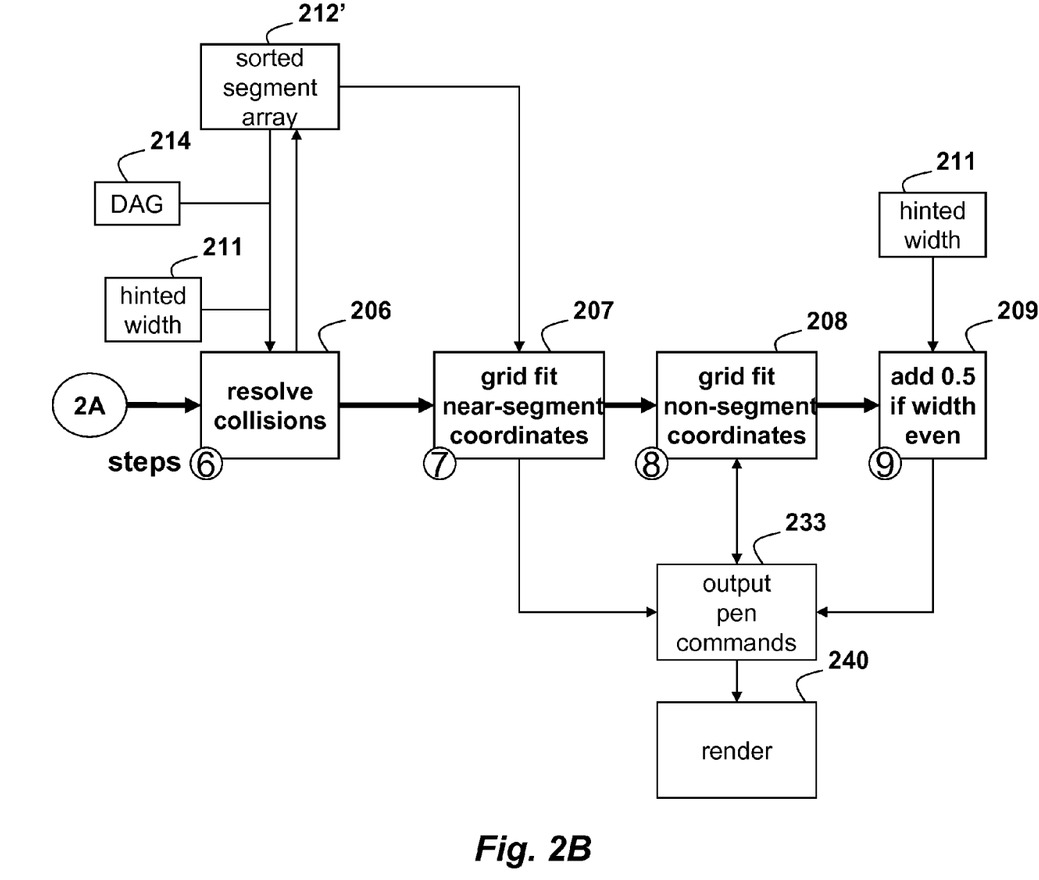

As shown in FIGS. 2A-2B, a method for aligning characters to a sampling grid, (e.g., a pixel or sub-pixel grid of an image to be displayed on a screen) takes as input 213 pen commands that trace the skeleton of the character. The method modifies original coordinates of the pen commands to "hinted" coordinates.

Paths

Characters to be rendered are represented by a path. The path according to embodiments of the invention is composed of a sequence of pen commands, e.g., moveto, lineto, and curveto, which define a set of stroke skeletons for a uniform width stroke-based character. The skeleton of a stroke-based character can be open, e.g., for a 'u', or closed, e.g., for an 'o'. The path representation enables arbitrary scaling, rotating, and other transformations.

The sequence of pen commands specify the movement and drawing of a virtual pen tracing the skeleton, and allow both line segments and Bézier curve segments to be drawn. The endpoints and the control vertices of each segment are specified in floating point image units.

Example pen commands follow; note that all coordinates (i.e., x, y, cx, and cy) are specified in floating point image units:

moveto x y—Starts a new path (i.e., a new stroke skeleton). This command sets the current point to (x, y).

lineto x y—Appends a straight line segment to the current path (i.e., the current stroke skeleton). The line segment extends from the current point to (x, y). After constructing the line segment, (x, y) becomes the new current point.

curveto cx cy x y—Appends a quadratic Bezier curve segment to the current path (i.e., the current stroke skeleton) between the current point and (x, y) using (cx, cy) as the Bezier control point. After constructing the curve segment, (x, y) becomes the new current point.

Overview of Alignment Method

The input 213 to the method for multiple alignment zone (MAZ) detection and grid fitting is (1) a sequence of pen commands representing the stroke-based character, (2) an original path width, and (3) the number of pixels per em (ppem) to be used for rendering the character, i.e., the scale of the character. The (x, y) coordinates of the pen commands are aligned to the sampling grid, i.e., are automatically hinted.

DEFINITIONS

The following definitions and terms are organized into several categories to facilitate comprehension of this description of the invention.

Given a sequence of pen commands, a lineto command whose endpoints have identical y coordinates determines a "horizontal segment." Similarly, a lineto command whose endpoints have identical x coordinates determines a "vertical segment." The general term "segment" can refer to either a horizontal segment or a vertical segment. For simplicity, a segment can be called "horizontal" if it is a horizontal segment. Similarly, a segment can be called "vertical" if it is a vertical segment.

Two segments S1 and S2 "overlap" if either: (1) S1 and S2 are both horizontal and there exists a vertical line that intersects both S1 and S2, or (2) S1 and S2 are both vertical and there exists a horizontal line that intersects both S1 and S2.

The "original coordinate" of a horizontal segment H is the original y coordinate of H in real-valued image coordinates, i.e., the y coordinate before grid fitting is applied. The "original coordinate" of a vertical segment V is the original x coordinate of V in real-valued image coordinates, i.e., the x coordinate before grid fitting is applied.

The "hinted coordinate" of a horizontal segment H is the y coordinate of H in real-valued image coordinates after grid fitting has been applied. The "hinted coordinate" of a vertical segment V is the x coordinate of V in real-valued image coordinates after grid fitting has been applied.

Let S1 and S2 be segments with original coordinates c1 and c2, respectively. S1 and S2 are in "ascending order" if c1 is less than or equal to c2 and in "descending order" if c1 is greater than or equal to c2. The terms "ascending order" and "descending order" apply generally to any number of segments.

Let S1, S2, and S3 be segments in ascending order. S2 is "between" S1 and S3 if and only if S1 overlaps S2, and S2 overlaps S3.

A segment C is a "child" or "child segment" of segment S if and only if all three of the following conditions are satisfied: (1) C's original coordinate is less than or equal to S's original coordinate, (2) C overlaps S, and (3) no segment lies between C and S.

Segment S is the "parent" or "parent segment" of segment C if and only if C is the child of S. If S has multiple child segments, the child segments are referred to as the "children" of S.

A segment D is a "descendant" of segment S if and only if: (1) D is a child of S, or (2) there exists some ordered sequence of segments S1, S2, . . . , Sn (where n is greater than or equal to 1) such that D is a child of S1, S{i} is a child of S{i+1} (where i is greater than or equal to 1 and less than n), and Sn is a child of S. If D is a descendant of S, then S is an "ancestor" of D.

A "segment tree" is the set of segments defined by a segment S and all descendants of S. The segment S is the "root segment" of the segment tree. The segment tree forms a directed acyclic graph (DAG) of segments.

Let S be a segment with original and hinted coordinates o and h, respectively. Let c be an integer defined as follows. If the hinted path width is an odd integer, then c is the maximum integer not greater than o, i.e., c=floor(o). The function floor produces the largest integer less than or equal to o.

If the hinted path width is an even integer, then c is the integer determined by rounding o to the nearest integer and subtracting 1 from the result, i.e., c=round(o)−1. S is "rounded up" if h=c+1 and S is "rounded down" if h=c. A segment tree is rounded up if every segment in the segment tree is rounded up. Similarly, a segment tree is rounded down if every segment in the segment tree is rounded down.

A segment S1 is "aligned" to another segment S2 if S1 has the same hinted coordinate as S2.

A segment S is "collapsed" if it has been aligned to at least one of its child segments. A segment S is "non-collapsed" if it has not been aligned to any of its child segments.

Two segments S1 and S2 "collide" if: (1) they overlap, (2) their hinted coordinates differ, and (3) their hinted coordinates differ by at most W units in real-valued image coordinates, where W is the hinted path width.

S1 and S2 "barely collide" if: (1) they collide, and (2) their hinted coordinates differ by exactly W units in real-valued image coordinates, where W is the hinted path width.

A "near-segment x coordinate" is the x coordinate of a pen command P such that: (1) the x coordinate coincides with, or is within a small predetermined value "epsilon" of, the original coordinate of a vertical segment V, and (2) the y coordinate of P overlaps V in the y direction.

A "near-segment y coordinate" is the y coordinate of a pen command P such that: (1) the y coordinate coincides with, or is within a small predetermined value "epsilon" of, the original coordinate of a horizontal segment H, and (2) the x coordinate of P overlaps H in the x direction.

More generally, the term "near-segment coordinate" can refer to either a near-segment x coordinate or a near-segment y coordinate.

"Non-segment coordinates" are coordinates of pen commands that are not "near-segment" coordinates, i.e., the sets of near-segment coordinates and non-segment coordinates are mutually exclusive and together comprise the complete set of pen command coordinates.

A "half-integer" is an element n of the set of real numbers such that n=k+0.5 for some integer k, e.g., −2.5, −1.5, −0.5, 0.5, 1.5, 2.5, and 3.5 are all half-integers.

The "integer pixel grid" is the set of ordered pairs (x, y) of real numbers x and y, such that at least one element of (x, y) is an integer. For example, coordinates (0, 0), (1.5, 0), and (1.97, 3) are on the integer pixel grid, but (1.7, 11.2) is not on the integer pixel grid. Geometrically, the integer pixel grid is a grid comprising the set of integer horizontal lines, e.g., y=−2, y=−1, y=0, y=1, and y=2, and the set of integer vertical lines, e.g., x=−2, x=−1, x=0, x=1, and x=2.

The "half-integer pixel grid" is the set of ordered pairs (x, y) of real numbers x and y such that at least one element of (x, y) is a half-integer. For example, (0, 0.5), (1.5, 0), and (1.97, 2.5) lie on the half-integer pixel grid, but (1.7, 11.2) does not. Geometrically, the half-integer pixel grid is a grid comprising the set of half-integer horizontal lines, e.g., y=−2.5, y=−1.5, y=−0.5, y=0.5, y=1.5, and y=2.5, and the set of half-integer vertical lines, e.g., x=−2.5, x=−1.5, x=−0.5, x=0.5, x=1.5, and x=2.5.

The "minimal anchor segment of an x coordinate" is the non-collapsed vertical segment with the maximal original coordinate that is less than or equal to x. The "maximal anchor segment of an x coordinate" is the non-collapsed vertical segment with the minimal original coordinate that is greater than or equal to x. Similarly, the "minimal anchor segment of a y coordinate" is the non-collapsed horizontal segment with the maximal original coordinate that is less than or equal to y, and the "maximal anchor segment of a y coordinate" is the non-collapsed horizontal segment with the minimal original coordinate that is greater than or equal to y.

During grid fitting, non-segment coordinates are linearly interpolated between their corresponding anchor segments. Non-segment coordinates that are missing at least one anchor segment are treated as a special case by using a "minimal" or a "maximal" edge of the character's bounding box as a "virtual" anchor segment, wherein the minimal and maximal edges correspond to the left and right edges of the bounding box for non-segment x coordinates, respectively, and wherein the minimal and maximal edges correspond to the bottom and top edges of the bounding box for non-segment y coordinates, respectively.

The following general notes apply to the method described below:

The method is invoked dynamically during rendering, see the related Applications. Therefore, the method is designed to achieve a favorable balance between high quality, small memory consumption, and computational efficiency.

The method can be invoked on any uniform-width stroke-based character, but it is designed and optimized for CJK characters.

Uniform-width stroke-based characters are largely comprised of horizontal and vertical strokes. Therefore, the method detects horizontal and vertical features of the character and aligns them to the sampling grid. The method does not make any effort to align other features, e.g., curves or diagonal lines, to the sampling grid. Coordinates that are not aligned to the sampling grid are instead hinted using interpolation, see below for details. This overall strategy balances the competing goals of high quality and high runtime performance.

The method detects and resolves "collisions" between strokes, thereby preventing important features from becoming visually indistinguishable, see below for details. Collision resolution plays a significant role in the quality of the results. The method uses a greedy method to resolve collisions. This method is computationally efficient but cannot always find the optimal grid fitting configuration. In practice, however, this method produces high-quality results across a wide range of characters. During collision resolution, the method does not attempt to preserve the original spacing or the original spacing proportions between segments.

To improve consistency in appearance across multiple characters, the method always aligns topmost and bottommost horizontal segments to the nearest pixel in the grid. Similarly, the method always aligns leftmost and rightmost vertical segments to the nearest pixel in the grid. This approach prevents further grid fitting adjustments, e.g., due to collision resolution, from affecting important horizontal and vertical features at the edges of characters, resulting in better alignment of these features across multiple characters when viewed on the same page.

Ultimately, grid fitting requires modifying the original coordinates of the pen commands to aligned or hinted pen commands. To minimize the distortion of the character's shape, the method never moves a coordinate more than 1.5 pixels away from its original value.

Steps 2 through 6 of the method (see below) perform grid fitting using the original path. No changes are made to the original pen commands until Step 7.

The method hints the path width by rounding the original path width to the nearest integer and fixing the width to at least 1 pixel. If the hinted path width is an even integer, then stroke skeletons are aligned to the half-integer pixel grid. If the hinted path width is an odd integer, then stroke skeletons are aligned to the integer pixel grid. This convention ensures that the edges of the rendered character are positioned on the sampling grid, thereby maximizing edge contrast.

To optimize performance and to maximize code re-use between floating point and fixed point implementations, most of the steps of the method perform grid fitting using the integer pixel grid, regardless of whether the hinted path width is even or odd. Adjustments to the hinted coordinates to accommodate the hinted path width are delayed until the final Step 9.

Steps 2 through 8 of the method described below are effectively applied twice in this implementation, once for horizontal segments, and once for vertical segments. Note that the method contains no dependencies between horizontal segments and vertical segments. Consequently, hardware and multi-core implementations of the method can process horizontal segments and vertical segments completely in parallel.

Method Steps

The input to the method is (1) a sequence of pen commands 213 having original coordinates 213', (2) an original path width, and (3) a number of pixels per em (ppem) to be used for rendering the character, i.e., the scale of the character.

Step 1. Determine 201 a width 211 for a hinted path by rounding the original path width to the nearest integer. Ensure that the hinted path width is at least one pixel. The stroke width can be specified as fraction of an em box, e.g., 3% or 5%. If the width is even, then align skeletons to half-integers (0.5, 1.5, 2.5, . . . ), and if odd, align the skeletons to integers (0, 1, 2, . . . ).

Step 2. Traverse the input pen commands 213 to identify 202 segments of the path. The segments are stored in an unordered segment array 212.

Step 3. Determine 203 a hinted coordinate 215 of each segment in the segment array. If the hinted path width is an odd integer, then determine the hinted coordinate by rounding the original coordinate to the nearest integer. If the hinted path width is an even integer, then determine the hinted coordinate by computing the floor of the original coordinate. In either case, the hinted coordinate can be modified below to resolve collisions, see Step 6, and to accommodate the hinted path width, see Step 9.

Step 4. Sort 204 the segments in the segment array into ascending order to obtain a sorted array 212', i.e., sort by non-decreasing original coordinates.

Step 5. Construct DAG 205. Identify the child segments of each segment in the sorted segment array 212', and construct 205 a directed acyclic graph (DAG) 214. The DAG is represented implicitly by linking each segment to its child segments.

The purpose of constructing this DAG is to detect and resolve collisions between segments in the next step. A collision between a segment S and a child segment C cannot occur during collision resolution if the current hinted coordinates of P and C differ by more than W+2 pixels, where W is the hinted path width 211. Therefore, to improve runtime efficiency, a link in the DAG is added between S and C if and only if their hinted coordinates differ by W+2 pixels or less.

Step 6. Detect 206 colliding segments and resolve collisions, due to hinting in Step 3, using a greedy bottom-up process. Visually, colliding segments appear to be a single thick stroke, instead of two separate strokes. Collisions can be resolved in some cases by adding +1 or −1 to the hinted coordinate of one of the segments so that the two segments become at least W+1 pixels apart where W is the hinted path width 211 determined in Step 1, see details below and FIG. 4.

Collisions are resolved using a greedy method. The greedy method traverses the DAG 214 in a bottom-up order, i.e., from the bottommost descendants to the topmost ancestors. Because the segments are sorted in ascending order in Step 4, this bottom-up traversal is accomplished by visiting each segment in the segment array, beginning with the first segment in the segment array, and ending with the last segment in the segment array.

Let M1 and M2 be the current hinted coordinates of the first and last segments in the segment array. To obtain consistent alignment of important features across multiple characters, all segments whose current hinted coordinates are equal to M1 remain fixed at M1, i.e., these segments will not be affected by collision resolution. Similarly, all segments whose current hinted coordinates are equal to M2 remain fixed at M2.

For each segment S visited during a bottom-up traversal of the segment array, apply the following steps.

Step 6a. If S's current hinted coordinate is equal to M1, then proceed to the next segment.

Step 6b. If S's current hinted coordinate is equal to M2, then apply the following steps for each child C of S that collides with S.

Step 6b1. If C barely collides with S, proceed to Step (6b2). Otherwise, proceed to Step (6b4).

Step 6b2. If C is rounded up and can be rounded down without colliding with any of its children, then round down C, and proceed to Step (6b5). For example, if C's original coordinate is 2.6 and the hinted path width is 1 pixel, then C's hinted coordinate is normally "rounded up" to 3.0. "Rounding down" instead produces the integer 2.0. Refer to the definitions of "rounded up" and "rounded down" in the terminology section above. This step attempts to eliminate a collision, and always avoids introducing any new collisions.

Step 6b3. If C is rounded up and the segment tree with root C can be rounded down without creating any collisions whatsoever in the segment tree, then round down the segment tree and proceed to Step (6b5). This step attempts to eliminate a collision, and always avoids introducing any new collisions.

Step 6b4. If S still collides with C, then align C to S. For example, if C's hinted coordinate is 4.0, S's hinted coordinate is 5.0, and the hinted path width is 1 pixel, then align C to 5.0.

Step 6b5. Done.

Step 6c. If S's current hinted coordinate is between M1 and M2, then apply the following steps for each child C of S that collides with S:

Step 6c1. If C barely collides with S, then proceed to Step (6c2). Otherwise, proceed to Step (6c5).

Step 6c2. If C is rounded up and can be rounded down without colliding with any of its children, then round down C and proceed to Step (6c6). For example, if C's original coordinate is 2.6 and the hinted path width is 1 pixel, then C's hinted coordinate is normally "rounded up" to 3.0. "Rounding down" instead produces the integer 2.0. This step attempts to eliminate a collision and always avoids introducing any new collisions.

Step 6c3. If C is rounded up and the segment tree with root C can be rounded down without creating any collisions whatsoever in the segment tree, then round down the segment tree and proceed to Step (6c6). This step attempts to eliminate a collision, and always avoids introducing any new collisions.

Step 6c4. If S is rounded down, then round up S and proceed to Step (6c6). For example, if S's original coordinate is 5.8 and the hinted path width is 2 pixels, then S's hinted coordinate is normally rounded down to 5.0, i.e., floor (5.8) =5.0=round (5.8)−1. Rounding up instead produces the integer 6.0. This step attempts to eliminate a collision but can introduce a collision between S and a parent of S. This potential collision is eliminated when processing the parent of S in a subsequent iteration of the bottom-up traversal of the DAG 214.

Step 6c5. Align S to C. For example, if C's hinted coordinate is 4.0, S's hinted coordinate is 5.0, and the hinted path width is 1 pixel, then align S to 4.0.

Step 6c6. Done.

Steps (6b2) through (6b3), and Steps (6c2) through (6c4) attempt to round segments C and S so that the segments are at least W+1 pixels apart, where W is the hinted path width 211. However, there are some cases in which collisions cannot be resolved by this method. Because C and S cannot be visually distinguished in these cases, Steps (6b4) and (6c5) align S and C, thereby simplifying the appearance of the character by aligning two segments to the same coordinate. Note that the difference between Step (6b4) and Step (6c5) is that in the former step, C is aligned to S, whereas in the latter step, S is aligned to C.

Figure 3:
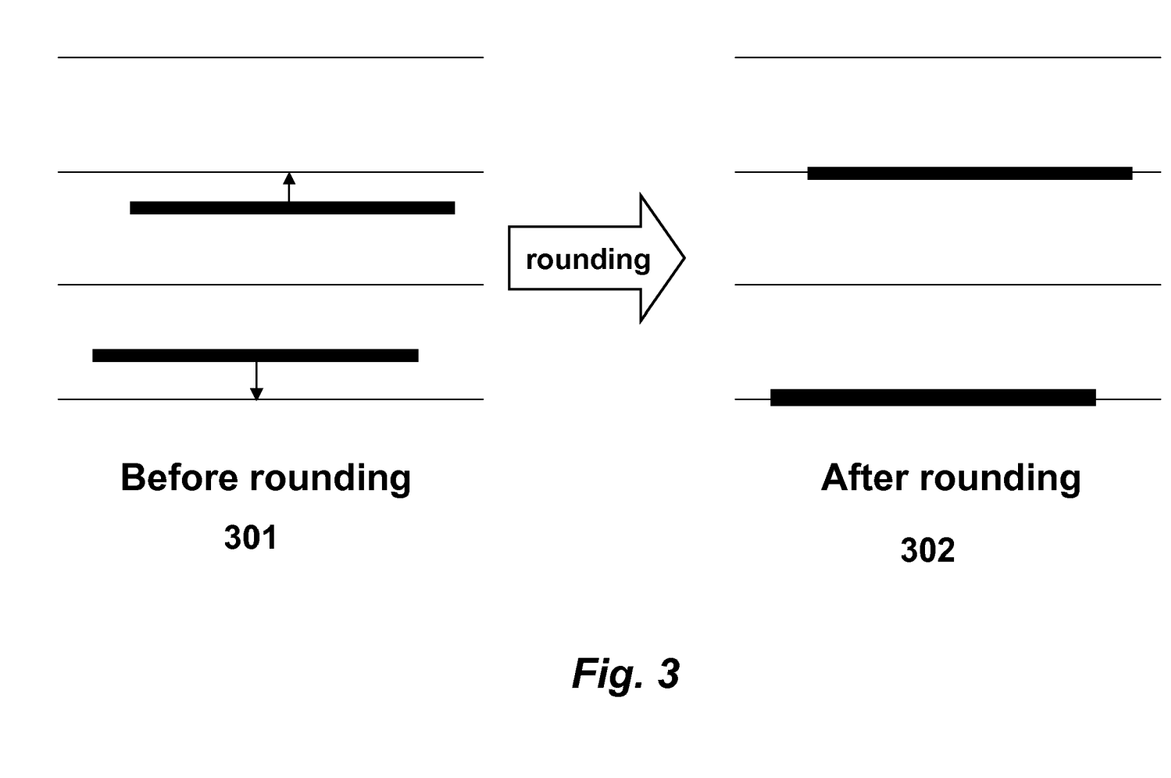
FIG. 3 is a diagram of segment alignment before and after rounding.

FIG. 3 shows before rounding 301 and after rounding 302 to a nearest grid line of the sampling grid (e.g., a nearest pixel or sub-pixel scanline of an image).

Figure 4:
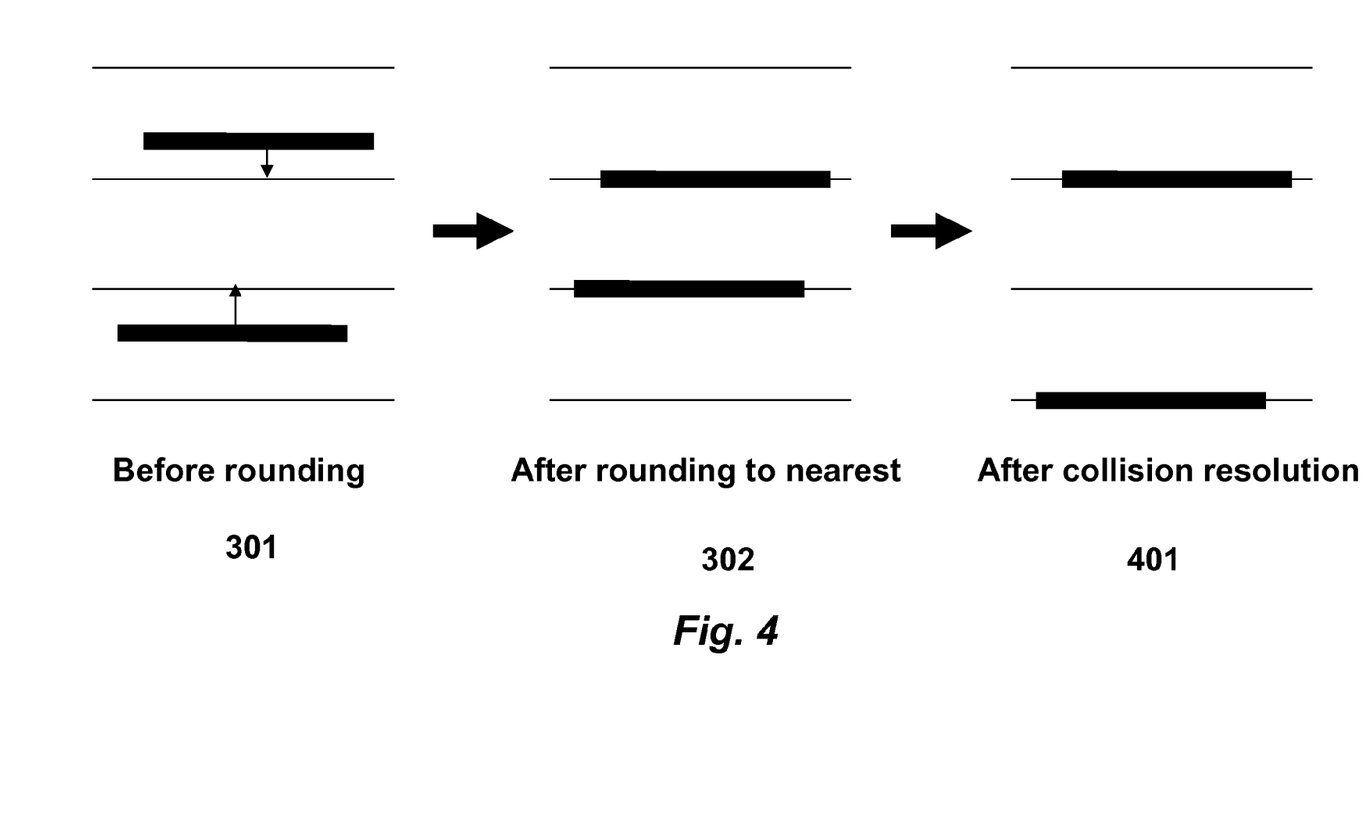
FIG. 4 is a diagram of segment alignment before and after rounding, and after collision resolution.

FIG. 4 shows before rounding 301, after rounding 302 to the nearest grid line of the sampling grid, and collision resolution 401.

Step 7. Perform grid fitting 207 on near-segment coordinates, and store the results in the output pen commands 233. The x coordinates of pen commands that are near a vertical segment and overlap the vertical segment in the y direction are aligned to the vertical segment. Similarly, the y coordinates of pen commands that are near a horizontal segment and overlap the horizontal segment in the x direction are aligned to the horizontal segment.

Step 8. Perform grid fitting 208 on non-segment coordinates and store the results in the output pen commands 233. Non-segment x coordinates of pen commands are linearly interpolated in the x direction between the minimal and maximal vertical anchor segments near x. Similarly, non-segment y coordinates of pen commands are linearly interpolated in the y direction between the minimal and maximal horizontal anchor segments near y.

Step 9. If the hinted path width is an even integer, then add 209 0.5 to each coordinate of each pen command. This step effectively aligns stroke skeletons to the half-integer pixel grid.

The output pen commands 233 for the uniform character strokes are now aligned to the sampling grid, and rendering 240 can proceed.

Note that although the method has been described with the use of Bezier curve segments to define the pen commands 213, any kind of curve segment, e.g., Hermite, Catmull-Rom, and B-spline, can be used.

Alignment of Stylized Stroke Characters

Another embodiment of our invention provides a method for aligning a stylized stroke character to the sampling grid—see the related applications for a description of stylized stroke characters.

Stylized Stroke Fonts (SSFs) are enhanced stroke-based fonts whose strokes have variable thickness and stylistic stroke ends—see "An Improved Representation for Stroke-based Fonts", SIGGRAPH 2006 Conference Abstracts and Applications, Elena J. Jakubiak, Ronald N. Perry, and Sarah F. Frisken. SSFs employ a modular structure that leverages the repetition of shape within a font, enabling SSFs to match the expressiveness of outline fonts with a memory footprint comparable to current uniform width stroke fonts.

Figure 5:
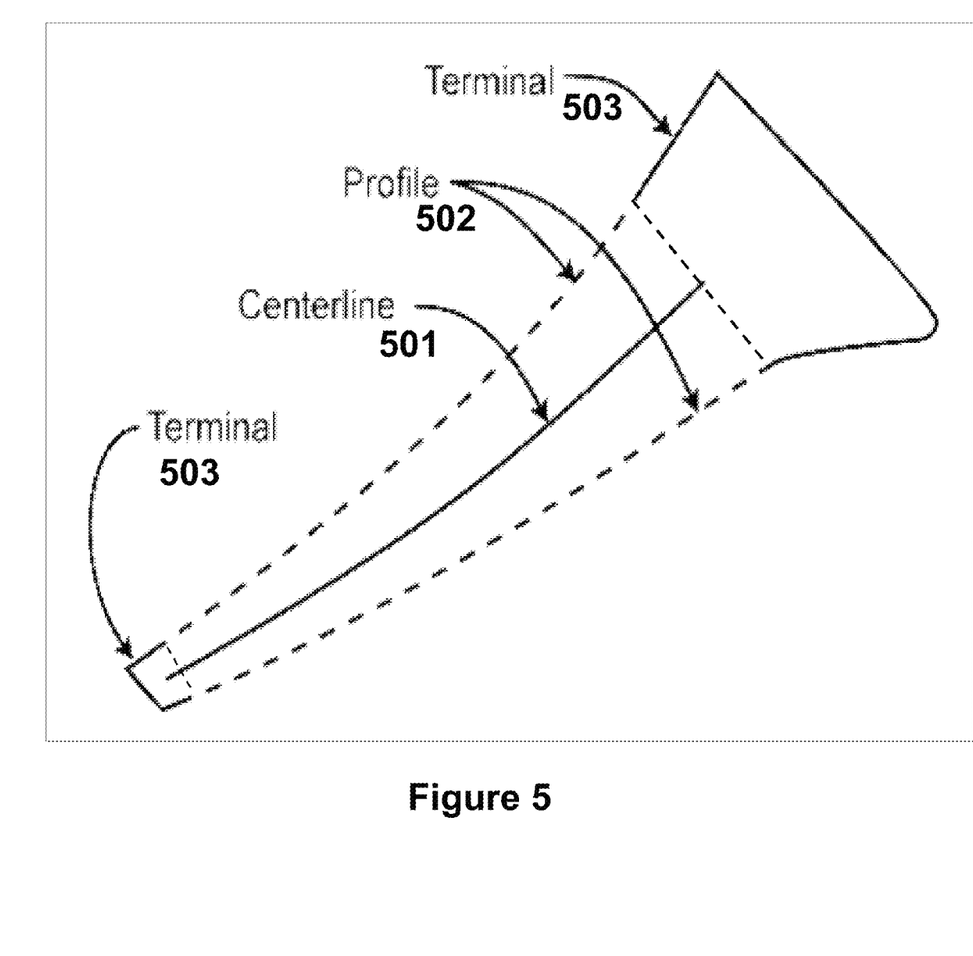
FIG. 5 is a schematic of a stylized stroke character to be aligned according to embodiments of the invention.

As shown in FIG. 5, the structure of an SSF stroke reflects the movement of a calligraphy brush. The body of the stroke includes a centerline 501, which reflects the path of the brush, and a profile 502, which reflects the change in pressure of the brush along the development. The terminals 503 of the SSF stroke are a stylized representation of the beginning and ending of a brush's movement as the tip of the brush is placed on and removed from the page. Each centerline 501 and terminal 503 is represented by an open, piecewise continuous path of line segments and Bezier curves. The profile 502 is represented by a set of Bezier curves, which define the perpendicular distance from the stroke centerline to both edges of the stroke.

In this embodiment, the method first determines a representative stroke width of the stylized stroke character. The representative stroke width can be determined in several ways. For example, the profiles 502 of the stylized stroke character can be sampled at a series of sample points. The sample points are then used to determine an average stroke width. As another example, the profiles 502 can be analyzed analytically to determine the representative stroke width. As a further example, a user specified nominal stroke width of the stylized stroke character can be used as the representative stroke width.

The method steps 1-9 described above are then invoked on the stylized stroke character, wherein the representative stroke width defines the original path width and centerlines 501 of the stylized stroke character define the pen commands 213. The output pen commands 233 define the aligned centerlines of stylized stroke character, thereby aligning the stylized stroke character to the sampling grid.

Operating Environment

The invention is operational with numerous general purpose or special purpose computing system environments or configurations. Examples of well known computing systems, environments, and/or configurations that are suitable for use with the invention include, but are not limited to, personal computers, server computers, handheld or laptop devices, multiprocessor or multi-core systems, graphics processing units (GPUs), application-specific integrated circuits (ASICs), field programmable gate arrays (FPGAs), microcontroller-based systems, set top boxes, programmable consumer electronics, network PCs, minicomputers, mainframe computers, distributed computing environments that include any of the above systems or devices, and the like. A monitor or other type of display device is connected to any of the above systems to enable the display of the alignment of the invention.

As described above, the method contains no dependencies between horizontal segments and vertical segments. Consequently, hardware and multi-core implementations of the method can process horizontal segments and vertical segments completely in parallel. For example, one core of a multi-core processor can perform alignment for the horizontal segments and another core of the multi-core processor can perform alignment for the vertical segments.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for aligning a character to a sampling grid of an image, wherein an original path tracing a skeleton of the character is specified by input pen commands having original coordinates, the original path having a uniform width, the method comprising the steps of:

determining a width of a hinted path by rounding the width of the original path to a nearest integer;

traversing the original path using the input pen commands to identify segments of the original path, and storing the segments in an array;

determining hinted coordinates for each segment in the array;

sorting the array in an ascending order to obtain a sorted array;

constructing a directed acyclic graph (DAG) from the segments in the sorted array;

resolving collisions between the segments using the sorted array, the DAG, and the width of the hinted path;

fitting the segments to the sampling grid and storing a result of the fitting in output pen commands having the hinted coordinates to align the skeleton of the character to an integer sampling grid; and adding 0.5 to each hinted coordinate of each output pen command only if the width of the hinted path is an even integer to align the skeleton of the character to a half-integer sampling grid wherein the steps of the method are performed by a processor.

2. The method of claim 1, further comprising:
rendering the output pen commands.

3. The method of claim 1, wherein the width of the hinted path width is at least one pixel.

4. The method of claim 1, wherein the sorting is by non-decreasing original coordinates.

5. The method of claim 1, wherein the sorting identifies child segments of each segment in the sorted array.

6. The method of claim 1, wherein the resolving further comprises:

detecting collisions between two segments if a difference between the hinted coordinates of the two segments is less than or equal to the width of the hinted path plus two pixels.

7. The method of claim 1, wherein the resolving traverses the DAG in a greedy bottom-up process.

8. The method of claim 6, wherein the resolving ensures that the difference is at least the width of the hinted path plus one pixel.

9. The method of claim 6, wherein x coordinates of pen commands that are near a vertical segment and overlap the vertical segment in the y direction are aligned to the vertical segment, and y coordinates of pen commands that are near a horizontal segment and overlap the horizontal segment in the x direction are aligned to the horizontal segment, and wherein all other x coordinates are linearly interpolated in the x direction between a minimal and maximal vertical anchor segment near x, and wherein all other y coordinates of pen commands are linearly interpolated in the y direction between a minimal and maximal horizontal anchor segment near y, and wherein a coordinate is near a segment if the coordinate is within a pre-defined distance from the segment.

10. The method of claim 1, wherein topmost and bottommost horizontal segments and leftmost and rightmost vertical segments are aligned to nearest grid points in the sampling grid.

11. The method of claim 1, wherein the aligning does not move the original coordinates more than 1.5 pixels in the hinted coordinates.

12. The method of claim 1, wherein horizontal and vertical segments are processed in parallel.

13. The method of claim 1, wherein the sampling grid is a pixel grid of the image and wherein the image is displayed on a screen.

14. The method of claim 1, wherein the sampling grid is a sub-pixel grid of the image and wherein the image is displayed on a screen.

15. The method of claim 1, wherein the character comprises stylized strokes, and further comprising:
   determining a representative path width from a profile of each stylized stroke.

16. The method of claim 15, wherein the representative path width is an average width of each stylized stroke.

17. The method of claim 15, wherein the representative path width is a nominal width of each stylized stroke.

18. The method of claim 15, wherein the determining samples the profile to determine the representative path width.

19. The method of claim 15, wherein the determining uses an analytic description of the profile to determine the representative path width.

* * * * *